3,505,071
HARDENING AGENTS FOR GELATIN COATING COMPOSITIONS

Salvatore Emmi, Binghamton, N.Y., assignor to GAF Corporation, New York, N.Y., a corporation of Delaware
No Drawing. Filed Mar. 14, 1967, Ser. No. 622,921
Int. Cl. G03c 1/30
U.S. Cl. 96—111                                    6 Claims

ABSTRACT OF THE DISCLOSURE

Hardening agents for gelatin coating compositions comprising butyne and propene derivatives.

---

The present invention relates in general to the hardening of gelatin and in particular to the hardening of photographic gelatin and gelatino silver halide emulsions whereby to yield compositions having an appreciable increase in melting point as well as good stability on aging with respect to fog, speed, tonal gradation and the like.

In the preparation of photographic gelatin dispersions and gelatino silver halide emulsions, it has been customary practice to treat the dispersion or emulsion at some stage prior to actual coating on a film base with a hardening agent, i.e., a substance capable of reducing the tendency of the gelatin to soften, distend or otherwise dissipate structurally due to environmental influences, e.g., as a result of subjection to photographic processing solutions. The incorporation of hardening agents into gelatin-based coating compositions is for the most part deemed vital in order to provide a final laminate element possessed of the requisite structural stability. As will be recognized, many commercial operations such as those associated with high speed photoreproduction may in some instances dictate the use of processing temperatures considerably in excess of those specified as efficacious for the particular photographic material in question having due regard to the nature of the emulsion addenda. The published literature, both patent and otherwise, is of course replete with reference to hardening materials which may be employed for the aforedescribed purposes with particular representatives including, for example, formaldehyde, hydroxyaldehydes, acrolein, glyoxal and derivatives thereof and mixtures of an aliphatic aldehyde with an aromatic compound containing at least one nuclearly substituted hydroxy group such as phenol, resorcinol, resorcylic aldehyde and the like. Although many of the hardening agents of the foregoing type have provided to be somewhat effective as regards imparting the desired hardening effects to the gelatin medium containing same, their use is invariably attended by one or more disadvantages. For example, and with particular reference to the problems attending the provision of gelatin-silver halide emulsions having optimum viscosity characteristics, it is often found that the hardening agent in question exhibits a pronounced tendency to deleteriously affect the sensitometric characteristics of the product emulsion leading to the formation of excessive fog, desensitization as well as a general flattening of gradation in the image obtained. In general, those hardening agents which can be categorized as formaldehyde liberators are found, almost invariably to be possessed of the aforedescribed objectionable features as well as that of "after hardening."

The foregoing situation has stimulated considerable industrial activity centered around the research and development of substances, which, while devoid of any tendency to affect adversely the sensitometric characteristics of the gelatin emulsion would nevertheless provide optimum hardening effects. Despite the meritorious achievement in this regard, the overall improvement has proved to be marginal. For example, many of the hardening agents proposed and which purportedly minimize the aforedescribed deleterious effects are capable of exerting hardening effects only when subjected to elevated temperatures. Unfortunately, the accompanying thermal effects are in many instances destructive of the photographic properties of the emulsion material and especially those of the high speed type.

In certain photographic applications it is of critical importance that each of the gelatin layers present in the photographic element, whether light sensitive or not, be resistant to water at elevated temperatures. This would be the case, for example, with high speed reproduction wherein processing solutions, e.g., developer, fixer, etc. are of an especially high order of activity. For the most part, those hardening agents considered to be more or less conventional have proved intolerably deficient for use with emulsions contemplated for high speed processing. In addition, it has been observed that many of the hardening agents specifically devised for high speed processing cause incubation fog and/or undesired "after hardening," i.e., continued hardening of the gelatin during storage. As will be readily apparent, such properties are highly objectionable and may well result in development restraint. Moreover, with photographic silver halide emulsions intended for use in the formation of colored images and wherein color coupling compounds are employed for such purposes, inter-reaction of the hardening agent with the color coupling components may be encountered.

It is thus manifestly clear that the advent of high speed process techniques has imposed additional and stringent requirements on the nature of the hardening agent which may be effectively employed. Firstly, it is imperative that the hardening agent be of the delayed action type, i.e., the hardening result does not obtain until actual processing of the photographic emulsion. Any premature hardening action will, as a practical matter, make emulsion handling extremely difficult if not impossible. This will be readily appreciated since the viscosity increase effected in the gelatin medium tends to vitiate any possibility of obtaining a uniform coating of the desired thickness. Secondly, and in view of the rather severe processing conditions characterizing high speed processing, it is absolutely imperative that the hardening agent be capable of exerting significant hardening effects whereby to render the gelatin layer containing same structurally stable and thus impervious to the effects of such conditions. Any defect in structural integrity will of course be aggravated by the use of processing conditions involving severe temperatures, solution activity, etc. and in all likelihood render the element unsuitable for commercial use.

Thus, the primary object of the present invention resides in the provision of hardening agents for incorporation into gelatin coating compositions wherein the foregoing and related disadvantages are eliminated or at least mitigated to a substantial extent.

Another object of the present invention resides in the provision of hardening agents for photographic silver halide emulsions, said agents providing a delayed hardening action, i.e., the viscosity-increasing effects imparted by such compounds are not evident until processing of the exposed emulsion.

A further object of the present invention resides in the provision of hardening agents beneficially adapted for use with gelatin silver halide emulsions, said agents being totally devoid of any tendency to deleteriously affect the emulsion properties such as fog, speed, contrast, density and the like.

Other objects and advantages of the present invention will become apparent hereinafter as the description proceeds.

The attainment of the foregoing and related objects is made possible in accordance with the present invention which in its broader aspects includes the provision of delay action hardening agents comprising at least one compound selected from the group consisting of those of the following structural formulae:

(I)  X—CH$_2$—C≡C—CH$_2$—X and (II)  CH$_2$=CH—CH$_2$—Y wherein X represents hydroxy or halogen, e.g., chloro, bromo, etc. and Y represents halogen, e.g., chloro, bromo, etc.

As specific examples of compounds falling within the ambit of the above structural formulae there may be mentioned the following:

1,4-butynediol
1,4-dichlorobutyne
3-bromopropene

Methods for the preparation of such compounds are extensively described in the literature both patent and otherwise. Moreover, such compounds are readily available commercially, e.g., from the GAF Corporation.

The hardening agents encompassed by the above formula may be advantageously employed in any of the layers normally associated wholly or partly of gelatin, whether such layer be light-sensitive or not. As will be appreciated, the urgency surrounding the obtention of satisfactory structural stability exists with regard to non-light-sensitized layers as well. Thus, the hardening agents described herein may be incorporated into any of the auxiliary layers containing significant quantities of gelatin, e.g., anti-halation layer, anti-abrasion or anti-static layer, and/or subbing layer. The latter embodiment is found to provide a significant measure of improvement in overall structural stability since, the presence of the hardening agent tends to augment considerably the primary function of the subbing layer, namely, the promotion of a firm adhesive bond between the support and subsequently applied layers.

The hardening agents described above may be added to the gelatin solution and/or light-sensitive silver halide emulsion at any convenient stage of the preparation. For example, such agents may be added shortly prior to coating the gelatin medium onto a suitable support, which may be glass, paper, cellulose, cellulose derivatives, or other suitable material conventionally employed for such purposes in the preparation of photographic elements.

Alternatively, such hardening agents may be incorporated subsequent to coating the gelatin medium onto the base material, e.g., by immersing the fabricated film element in a solution of the hardener. The attainment of optimum characteristics quite obviously will depend upon the selection of conditions of temperature, time of immersion, concentration and pH, these values being capable of ready determination in a particular instance.

The hardening agent can be conveniently provided in the form of a suitable solution in a water miscible solvent, e.g., methanol, ethanol, acetone, etc. as well as mixtures of one or more in water in concentrations ranging from about 1% to about 20%. The concentration of the hardener solution is not particularly critical per se and is selected solely for purposes of affording maximum control when added to the emulsion, film element, etc.

The amount of hardening agent actually incorporated into the gelatin coating composition will depend primarily on the desired increase in melting point. Thus, it has been found that substantial increases in melting point of photographic materials may be obtained by adding amounts sufficient to yield a hardener concentration within the range of from about .005 part to about 0.20 part per part of dry gelatin. Again, the foregoing concentration limitations are significant solely from the standpoint of assuring maximum realization of optimum hardening effects. It will thus be understood that departures from such ranges may be dictated in a particular circumstance depending upon the requirements of the processor.

The following examples are given for purposes of illustration only and are not to be considered as constituting a limitation on the present invention.

EXAMPLE I

This example illustrates the improvement obtained in melting point characteristics in a simple gelatin coating composition, i.e., of the type which would be suitable for use as an auxiliary layer in the fabrication of photographic film elements. As will be noted from the inspection of Table I below, melting point evaluations are taken both prior to and subsequent to immersion in alkaline media maintained at a pH on the order of those characterizing the alkaline solutions employed in the post-exposure treatment of photographic film. In each case, the melting point evaluations are conducted three days after coating the gelatin solution onto a film base by placing the respective samples in water and gradually raising the water temperature to a point at which the gelatin coating melted, disintegrated or separated from the film base. In each case, the gelatin is coated onto the film base at neutral pH, i.e., pH 7. The melting point corresponds to that temperature at which the foregoing occurred. The results obtained are tabulated as follows:

TABLE I

| Hardener | Cc. of 0.1 M hardener solution | M.P. before alkaline immersion (° C.) | M.P. after 2 min. alkaline immersion at pH 17 (° C.) |
|---|---|---|---|
| Control | | 39 | 45 |
| 1,4-butynediol | 10 | 39 | 55 |
| 1,4-dichlorobutyne | 10 | 40 | 75 |
| 3-bromopropene | 10 | 40 | 50 |

As will be made readily manifest from an inspection of the above summarized data, the hardening agents described herein make possible the obtention of a marked increase in melting point of the gelatin coating composition, such delayed hardening effects becoming evident as a result of exposure to alkaline media. As will be further noted, the hardening effects imparted by such compounds are negligible if not non-existent despite the fact that the gelatin coating containing same was left to stand for a period of three days prior to melting point evaluation. The delayed-action property previously discussed is thus very much in evidence. It will also be appreciated that the increase in melting point obtained extends considerably the adaptability of photographic film elements containing the instant hardening agents to high speed processing involving the use of high temperature solutions.

EXAMPLE II

This example illustrates the improved hardening effects obtainable with the compounds of the present invention when included as a component of a photographic silver halide emulsion.

Several one-kilogram samples of a fine grained chlorobromide photographic emulsion prepared in conventional manner, each containing approximately 5% (50 gms./kilo) of an inert gelatin and having incorporated therein 20 cc. of a 5% solution of 1,4-butynediol; 1,4-dichlorobutyne and 3-bromopropene respectively, are coated onto a cellulose triacetate film support. A control sample of the identical emulsion but omitting the hardening agent is likewise prepared. Each of the samples is conditioned for 8 days at room temperature and 59% relative humidity prior to melting point evaluation. The melting points, determined in the manner described in Example I, are taken, subsequent to photographic exposure utilizing a Type IB Sensitometer, both before and after alkaline development. The results obtained are summarized in Table II below:

TABLE II

| Hardener | Concentration | M.P. before development (° C.) | M.P. after development (° C.) |
|---|---|---|---|
| Control | | 39 | 45 |
| 1,4-butynediol | 20 cc. (5% solution in MeOH). | 39 | 80 |
| 1,4-dichlorobutyne | do | 40 | 90+ |
| 3-bromopropene | do | 40 | 80 |

As the above data makes manifestly clear, improvement in hardening properties similar to that described in Example I is obtained.

As stated hereinbefore, the hardening agents of the present invention despite providing improvement in the hardening characteristics of the gelatin coating compositions in no way deleteriously affect the sensitometric properties of the photographic element containing same. Thus, photographic emulsions of the type described in Example II and containing varying concentrations of the hardening agents exemplified, following photographic exposure and development exhibited excellent speed, contrast, density, etc. Moreover, such improvements are realized despite the use of highly active photographic processing solutions. Again, the importance of this particular aspect cannot be emphasized too strongly and especially in view of the fact that efficacious use of the more conventional hardening agents heretofore provided in the art invariably requires the conjoint use of one or more additional ingredients for purposes of suppressing, e.g., emulsion fogging.

The hardening agents of the present invention present the further advantage that they are readily adaptable to use in combination with any of the conventional photographic emulsion addenda, e.g., speed-increasing agents, anti-foggants, and the like. The inclusion of materials of the latter type is particularly effective in those instances wherein the photographic emulsion product is contemplated for use under what would ordinarily be considered extreme conditions, i.e., in terms of solution activity as well as processing temperature.

The improvements described herein are noted to obtain with various types of gelatin silver halide emulsion, e.g., spectral sensitized emulsions, non-spectral sensitized emulsions, such as, X-ray emulsions and the like. Furthermore, the light-sensitive silver salt employed may be any of those described in the art, such as, silver bromide, silver iodide, silver chloride, mixed silver halide, e.g., silver chlorobromide, silver bromoiodide and the like.

The hardening agents of the present invention may likewise be employed in emulsions intended for color photography, e.g., emulsions containing color-forming coupling compounds or alternatively, emulsions contemplated for color development by treatment with a developer solution containing the coupler. Such hardening agents may also be used with emulsions intended for use in diffusion transfer processing, color transfer processing, i.e., processes dependent upon the diffusion of silver halide, developer, dye developer, coupler, or dye from the light-sensitive element to a suitable receiving layer.

This invention has been described with respect to certain preferred embodiments and there will become obvious to persons skilled in the art other variations, modifications, and equivalents which are to be understood as coming within the scope of the present invention.

What is claimed is:

1. A composition comprising gelatin containing therein at least one hardening compound selected from the group consisting of those of the following structural formulae:

(I) $$X-CH_2-C\equiv C-CH_2-X$$

and (II) $$CH_2=CH-CH_2-Y$$

wherein X is selected from the group consisting of hydroxy and halogen and Y represents halogen.

2. A composition according to claim 1, further containing a light-sensitive silver halide.

3. A composition according to claim 1, wherein said hardening compound comprises 1,4-butynediol.

4. A composition according to claim 1, wherein said hardening compound comprises 1,4-dichlorobutyne.

5. A composition according to claim 1, wherein said hardening compound comprises 3-bromopropene.

6. A photosensitive element comprising a support coated with the composition of claim 2.

References Cited

UNITED STATES PATENTS 3,212,900   10/1965   Oguchi et al. _____ 96—109

GEORGE F. LESMES, Primary Examiner

R. E. MARTIN, Assistant Examiner

U.S. Cl. X.R.

96—407; 106—125; 260—117

PO-1050
(5/69)

UNITED STATES PATENT OFFICE
CERTIFICATE OF CORRECTION

Patent No. 3,505,071          Dated April 7, 1970

Inventor(s)  SALVATORE EMMI

It is certified that error appears in the above-identified patent and that said Letters Patent are hereby corrected as shown below:

In Table 1, column 4, lines 30-40, the heading over the third column of data should read -- pH 11 -- instead of "pH 17."

SIGNED AND
SEALED
AUG 4 - 1970

(SEAL)
Attest:

Edward M. Fletcher, Jr.
Attesting Officer

WILLIAM E. SCHUYLER, JR.
Commissioner of Patents